United States Patent
Takeuchi et al.

(10) Patent No.: US 11,681,882 B2
(45) Date of Patent: Jun. 20, 2023

(54) POSITION SPECIFYING DEVICE, POSITION SPECIFYING SYSTEM, POSITION SPECIFYING METHOD, AND COMPUTER READABLE STORAGE MEDIUM

(71) Applicant: Mitsubishi Electric Corporation, Tokyo (JP)

(72) Inventors: Takeshi Takeuchi, Tokyo (JP); Yusuke Kobayashi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 37 days.

(21) Appl. No.: 17/272,449

(22) PCT Filed: Sep. 7, 2018

(86) PCT No.: PCT/JP2018/033305
§ 371 (c)(1),
(2) Date: Mar. 1, 2021

(87) PCT Pub. No.: WO2020/049740
PCT Pub. Date: Mar. 12, 2020

(65) Prior Publication Data
US 2021/0319194 A1    Oct. 14, 2021

(51) Int. Cl.
*G06K 7/10* (2006.01)
(52) U.S. Cl.
CPC .............................. *G06K 7/10366* (2013.01)
(58) Field of Classification Search
CPC ..... G06K 7/10366; G06Q 10/06; G06Q 50/30
(Continued)

(56) References Cited

U.S. PATENT DOCUMENTS

| | | | |
|---|---|---|---|
| 8,478,462 B2 * | 7/2013 | Brady | B61L 25/048 |
| | | | 701/19 |
| 2006/0097871 A1 * | 5/2006 | Oliveras | G06Q 10/087 |
| | | | 340/572.1 |

(Continued)

FOREIGN PATENT DOCUMENTS

| | | | |
|---|---|---|---|
| CN | 104787088 A | * | 7/2015 |
| EP | 3279856 A1 | | 2/2018 |

(Continued)

OTHER PUBLICATIONS

International Search Report (PCT/ISA/210) with translation and Written Opinion (PCT/ISA/237) dated Oct. 30, 2018, by the Japan Patent Office as the International Searching Authority for International Application No. PCT/JP2018/033305.

(Continued)

*Primary Examiner* — Yong Hang Jiang
(74) *Attorney, Agent, or Firm* — Buchanan Ingersoll & Rooney PC

(57) ABSTRACT

Included are: a storage unit that stores device installation position information indicating installation positions for devices installed under floors of vehicles of a train, stores reading locations at each of which at least one individual information item identifying one of the devices is read from an identification tag storing the individual information item, each of the reading locations being where radio waves are emitted toward the identification tag affixed to corresponding one of the devices, and stores, correspondingly to radio wave strength for each of the plurality of the reading locations, at least one individual information item that is read with varied radio wave strengths in radio wave emission; and a position specifying unit that ascertains which device carrying the individual information item is in which installation position of the vehicles of the train and associ- (Continued)

ates the installation position with the individual information item identified.

18 Claims, 9 Drawing Sheets

(58) Field of Classification Search
USPC .......................................................... 340/10.1
See application file for complete search history.

(56) References Cited

U.S. PATENT DOCUMENTS

| | | | |
|---|---|---|---|
| 2006/0267733 A1* | 11/2006 | Steinke | G06K 7/10386 340/10.3 |
| 2007/0188342 A1* | 8/2007 | Valeriano | G06K 17/00 340/8.1 |
| 2010/0194533 A1* | 8/2010 | Sullivan | H04Q 9/00 340/10.1 |
| 2014/0033752 A1* | 2/2014 | Gunjima | B61D 27/0072 62/239 |

FOREIGN PATENT DOCUMENTS

| | | | |
|---|---|---|---|
| JP | 2010205127 A | | 9/2010 |
| JP | 2012076681 A | | 4/2012 |
| TW | 201902753 A | * | 1/2019 |
| WO | 2016157392 A1 | | 10/2016 |

OTHER PUBLICATIONS

Office Action dated Jan. 24, 2022, issued in corresponding Indian Patent Application No. 202127008601, 7 pages.

* cited by examiner

FIG.5

| INDIVIDUAL INFORMATION ITEM | A | | B | | C | | D | | E | | F | | G | | H | |
|---|---|---|---|---|---|---|---|---|---|---|---|---|---|---|---|---|
| | LOW | HIGH | LOW | HIGH | LOW | HIGH | LOW | HIGH | LOW | HIGH | LOW | HIGH | LOW | HIGH | LOW | HIGH |
| 101 | ○ | | | ○ | | | | | | | | | | | | |
| 102 | ○ | | ○ | ○ | | | | | | | | | | | | |
| 103 | | | ○ | ○ | ○ | ○ | | | | | | | | | | |
| 104 | | | | | ○ | ○ | ○ | ○ | | | | | | | | |
| 105 | | | | | | | | ○ | ○ | | | | | | | |
| 106 | | | | | | | | | ○ | ○ | | ○ | | | | |
| 107 | | | | | | | | | | | ○ | ○ | ○ | ○ | | ○ |
| 108 | | | | | | | | | | | ○ | ○ | ○ | ○ | ○ | ○ |

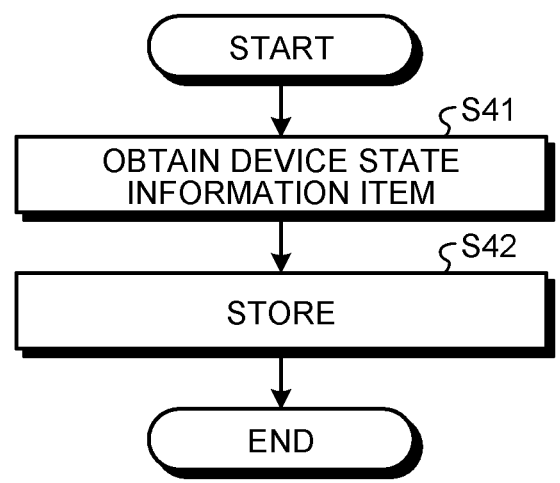

POSITION SPECIFYING DEVICE, POSITION SPECIFYING SYSTEM, POSITION SPECIFYING METHOD, AND COMPUTER READABLE STORAGE MEDIUM

FIELD

The present invention relates to a position specifying device that specifies positions of devices installed on railroad vehicles and also relates to a position specifying system, a position specifying method, and a position specifying program.

BACKGROUND

Each of vehicles composing a train has a plurality of devices installed under a floor of a passenger compartment. When there is a failed device, ascertaining what kind of train in what kind of operation has actually used the failed device can be helpful in ascertaining a cause of failure. However, after the devices installed on the vehicle are removed for repair, maintenance, or the like, there are cases where the devices are not returned to the vehicle. There are also cases where the vehicles are relocated relative to one another in a composition of the train, resulting in changes in the composition of the train. Individual information items that respectively identify the devices installed on the train are not currently managed. Therefore, ascertaining what kind of train in what kind of operation has used a certain device, has not been possible.

In a system that is described in Patent Literature 1 for managing a position of a device housed in a rack, a radio frequency identifier (RFID) tag storing position information about a device installation part of the rack is affixed to the rack, and an RFID tag storing an individual information item of the device is affixed to the device. With the device installed at the device installation part of the rack, the RFID tag storing the position information is shielded by the device installation part to be prevented from being read by a reading means. Instead, the RFID tag storing the individual information item of the device affixed to the device, is read. In this management technique disclosed for grasping what kind of device is installed at which position of the rack, the device installation part of the rack is associated with the individual information item of the device.

CITATION LIST

Patent Literature

Patent Literature 1: Japanese Patent Application Laid-open No. 2010-205127

SUMMARY

Technical Problem

However, when the above conventional technique is used for specifying a position of a device installed in a train, an RFID tag storing position information about a device installation part must be affixed to a device installation position, and when the device installed, the RFID tag storing the position information must be shielded by the device installation part to be prevented from being read by a reading means. Such a configuration problematically causes a vehicle body of the train and the device to be installed to have limitations and cannot be used particularly in a vehicle body already put into operation.

The present invention has been made in view of the above, and an object of the present invention is to obtain a position specifying device that specifies positions of devices in a train.

Solution to Problem

A position specifying device according to an aspect of the present invention includes a storage unit that stores device installation position information indicating a plurality of installation positions for a plurality of devices installed under floors of a plurality of vehicles of a train, stores a plurality of reading locations at each of which at least one individual information item identifying one of the plurality of the devices is read from an identification tag storing the individual information item, each of the reading locations being where radio waves are emitted toward the identification tag affixed to corresponding one of the plurality of the devices, and stores, correspondingly to radio wave strength for each of the plurality of the reading locations, at least one individual information item that is read with varied radio wave strengths in radio wave emission toward the identification tag of the corresponding one of the devices. The position specifying device also includes a position specifying unit that ascertains, by use of the device installation position information and the individual information items read with the varied radio wave strengths at the plurality of the reading locations, which one of the plurality of the devices each carrying the individual information item is in which one of the plurality of the installation positions of the plurality of the vehicles of the train and associates the one of the plurality of the installation positions with the individual information item identified.

Advantageous Effects of Invention

The position specifying device according to the present invention is capable of specifying the positions of the plurality of the devices in the train.

BRIEF DESCRIPTION OF DRAWINGS

FIG. 5 illustrates an example of a registration table that is to be stored in a storage unit of the position specifying device according to the first embodiment and is to store reading locations, radio wave strengths, and the individual information items that have been read.

FIG. 12 is a flowchart illustrating how the position specifying device according to the second embodiment operates when obtaining the device state information item.

DESCRIPTION OF EMBODIMENTS

With reference to the drawings, a detailed description is hereinafter provided of position specifying devices, position specifying systems, position specifying methods, and position specifying programs according to embodiments of the present invention. It is to be noted that these embodiments are not restrictive of the present invention.

First Embodiment

Figure 1:
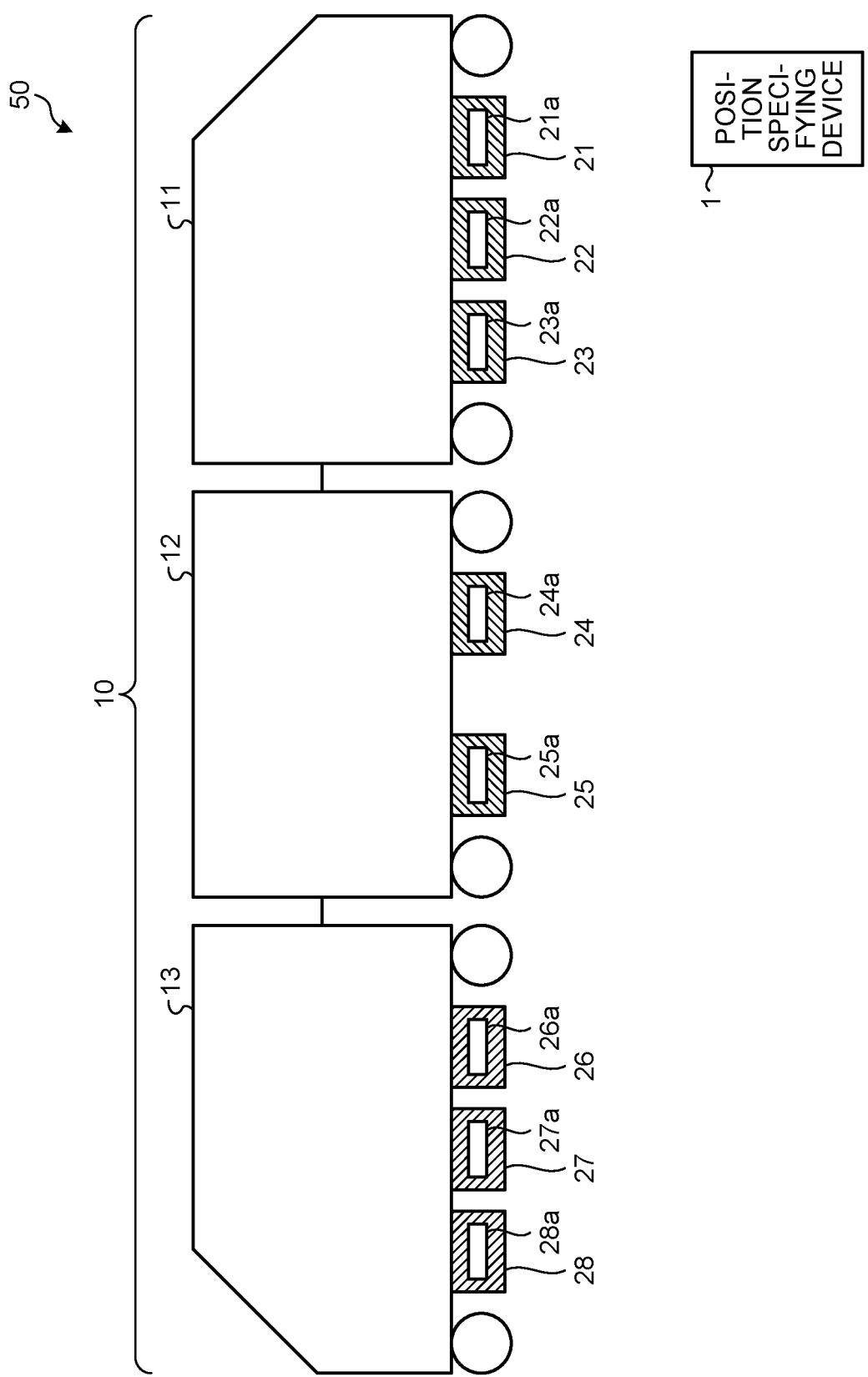
FIG. 1 illustrates a configuration example of a position specifying system according to a first embodiment.
Figure 2:
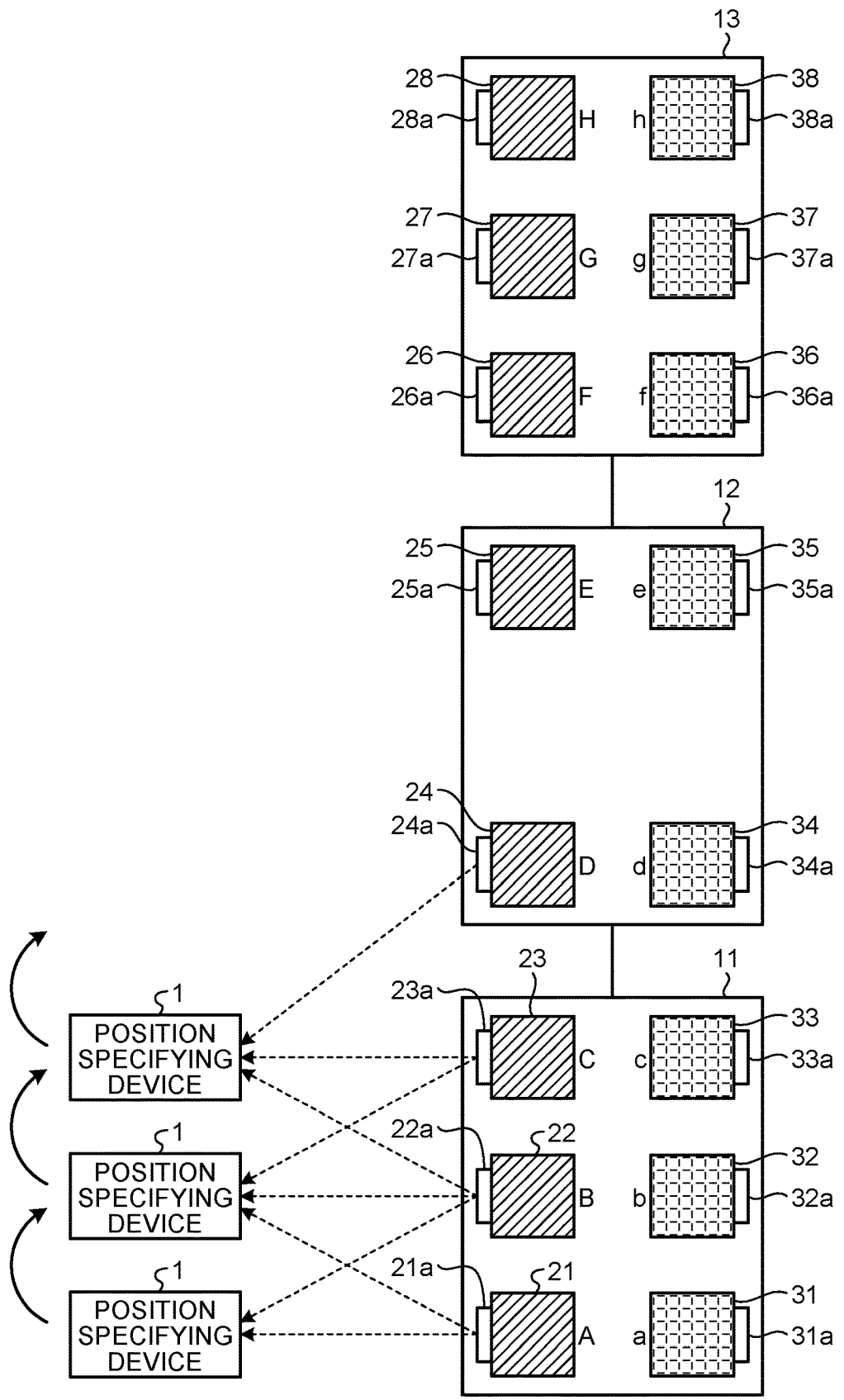
FIG. 2 is an image illustrating how a position specifying device reads individual information items of devices from identification tags each affixed to the device in the position specifying system according to the first embodiment.

FIG. 1 illustrates a configuration example of a position specifying system 50 according to the first embodiment of the present invention. FIG. 2 is an image illustrating how a position specifying device 1 reads individual information items of devices from identification tags each affixed to the device in the position specifying system 50 according to the first embodiment. FIG. 2 illustrates the devices installed on vehicles 11 to 13 of a train 10 in a view looking down at the train 10 from which passenger compartments are removed.

The position specifying system 50 includes the identification tags 21a to 28a affixed respectively to the devices 21 to 28, which are installed under floors of the vehicles 11 to 13 of the train 10. The position specifying system 50 also includes, along an opposite side from a side of the train 10 that is illustrated in FIG. 1, the identification tags 31a to 38a affixed respectively to the devices 31 to 38, which are installed under the floors of the vehicles 11 to 13. Non-limiting examples of the devices 21 to 28 and 31 to 38, which are installed under the floors of the vehicles 11 to 13, include brakes, variable-voltage/variable-frequency (VVVF) inverters, protective devices, and static inverters (SIVs). Stored in each of the identification tags 21a to 28a and 31a to 38a is the individual information item identifying the device with the affixed identification tag. The individual information item is, for example, a serial number of the device. When hereinafter described without distinction, the devices 21 to 28 and 31 to 38 may be simply referred to as the devices. When hereinafter described without distinction, the identification tags 21a to 28a and 31a to 38a may be simply referred to as the identification tags. The position specifying system 50 also includes the position specifying device 1. The position specifying device 1 emits radio waves toward the affixed identification tags of the devices to read the individual information items from the identification tags.

In the present embodiment, the identification tags are assumed to be wireless tags. The wireless tags are, for example, RFID tags. The position specifying device 1 is capable of reading the individual information items of the devices from a plurality of identification tags at a time by emitting the radio waves over a wide range. It is to be noted that while each of the identification tags illustrated in FIGS. 1 and 2 is large compared with an actual size of the device, a size of the identification tag is small enough compared with the size of the device. The position specifying system 50 ascertains the individual information items of the devices installed under the floors of the vehicles 11 to 13 of the train 10 and associates the devices' individual information items correspondingly with installation positions of the devices on the vehicles 11 to 13 of the train 10.

Figure 3:
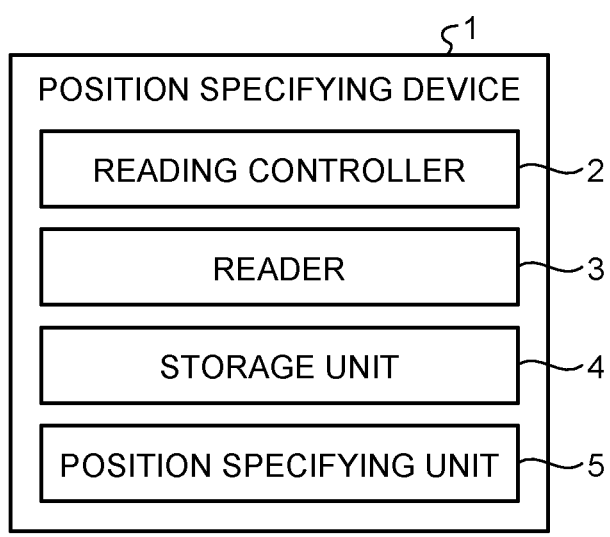
FIG. 3 is a block diagram illustrating a configuration example of the position specifying device according to the first embodiment.

A description is provided of a configuration of the position specifying device 1. FIG. 3 is a block diagram illustrating a configuration example of the position specifying device 1 according to the first embodiment. The position specifying device 1 includes a reading controller 2, a reader 3, a storage unit 4, and a position specifying unit 5.

On the basis of device installation position information indicating installation positions for the devices under the floors of the vehicles 11 to 13 of the train 10, the reading controller 2 indicates, to a user, a reading location where the position specifying device 1 should be when reading the individual information items by emitting radio waves toward the identification tags affixed to the devices. The present embodiment is based on the assumption that the user carries the position specifying device 1. By carrying the position specifying device 1 to move the position specifying device 1, the user changes the reading location and allows the position specifying device 1 to emit radio waves toward the identification tags for reading the individual information items. The reading controller 2 controls strength of the radio waves that the reader 3 emits toward the identification tags at the reading location. The device installation position information is such information as illustrated in FIG. 2, indicating the installation positions for the devices on the vehicles. In the case of FIG. 2, the device installation position information indicates that the devices installed on each of the vehicles 11 and 13 of the train 10 are six in number and that the devices installed on the vehicle 12 of the train 10 are four in number. The device installation position information also indicates that the vehicle 12 has a space between a position D, which is an installation position of the device 24, and a position E, which is an installation position of the device 25, and a space between a position d, which is an installation position of the device 34, and a position e, which is an installation position of the device 35.

The reading location here is, for example, when viewed from the side of the train 10, the position specifying device 1 fronts on the devices in the respective installation positions A to H illustrated in FIG. 2 or the devices in the respective installation positions a to h illustrated in FIG. 2 to read the individual information items of the devices. As FIG. 2 illustrates, the position specifying device 1 starts reading the individual information items in front of the device 21 installed at the position A, and the reading location keeps changing until the position specifying device 1 reads the individual information items in front of the device 28 installed at the position H. The position specifying device 1 is carried by the user when the user changes or shifts the reading location. On the side opposite from the devices 21 to 28, the position specifying device 1 starts reading the individual information items in front of the device 31 installed at the position a, and the reading location keeps changing until the position specifying device 1 reads the individual information items in front of the device 38 installed at the position h. It is to be noted that the order in which the position specifying device 1 reads the individual information items of the devices is not limited to the above example. Along the one side, the position specifying device 1 may start from in front of the position H and finish reading in front of the position A. Along the opposite side, the position specifying device 1 may start from in front of the position h and finish reading in front of the position a. In one example, the position specifying device 1 may read the individual information items of the devices 21 to 28, starting from in front of the position A and finish reading in front of the position H. Subsequently, the position specifying device 1 may read the individual information items of the devices 31 to 38, starting from in front of the position h and finish reading in front of the position a. The reading controller 2 may use a display that is not illustrated or a speech when indicating the reading location to the user. Non-limiting examples of the location specification include "Please move to the reading location in front of the position B".

In accordance with the radio wave strength variably controlled by the reading controller 2 in the radio wave emission, the reader 3 reads, from one or more of the tags, the individual information items stored in the identification tags affixed to the corresponding devices. The reader 3 stores, in the storage unit 4, the reading location where the reader 3 has read the individual information items and also stores, in the storage unit 4, that corresponds to radio wave strength for each of the reading locations, the individual information items that have been read with the varied radio wave strengths in the radio wave emission toward the identification tags of the devices. The radio wave strength may be changed manually or automatically.

Stored in the storage unit 4 is the device installation position information indicating the installation positions for the devices under the floors of the vehicles 11 to 13 of the train 10. Moreover, the storage unit 4 stores the reading locations where the individual information items have been read from the devices' affixed identification tags each storing the individual information item, which identifies the device, and also stores, correspondingly to radio wave strength for each of the reading locations, the individual information items that have been read with the varied radio wave strengths in the radio wave emissions toward the identification tags of the devices. Each of these reading locations is where the position specifying device 1, namely, the reader 3 has emitted the radio waves toward the identification tags.

Using the device installation position information stored in the storage unit 4 and the individual information items stored correspondingly to radio wave strength for each of the reading locations in the storage unit 4, the position specifying unit 5 ascertains which one of the devices each carrying the individual information item is in which one of the installation positions of the vehicles 11 to 13 of the train 10. The position specifying unit 5 associates the installation position indicated in the device installation position information with the individual information item of the device.

In the present embodiment, the position specifying device 1 is configured to be portable by the user and is assumed to perform all the processes. However, this is not limiting. For example, the position specifying device 1 may include a reading device that is constituted by the reading controller 2, the reader 3, and the storage unit 4, and an operational device that is constituted by the storage unit 4 and the position specifying unit 5. The reading device shares the contents of the storage unit 4 with the operational device by transmitting the contents of the storage unit 4 via communication or passing the contents of the storage unit 4 via a storage medium.

Figure 4:
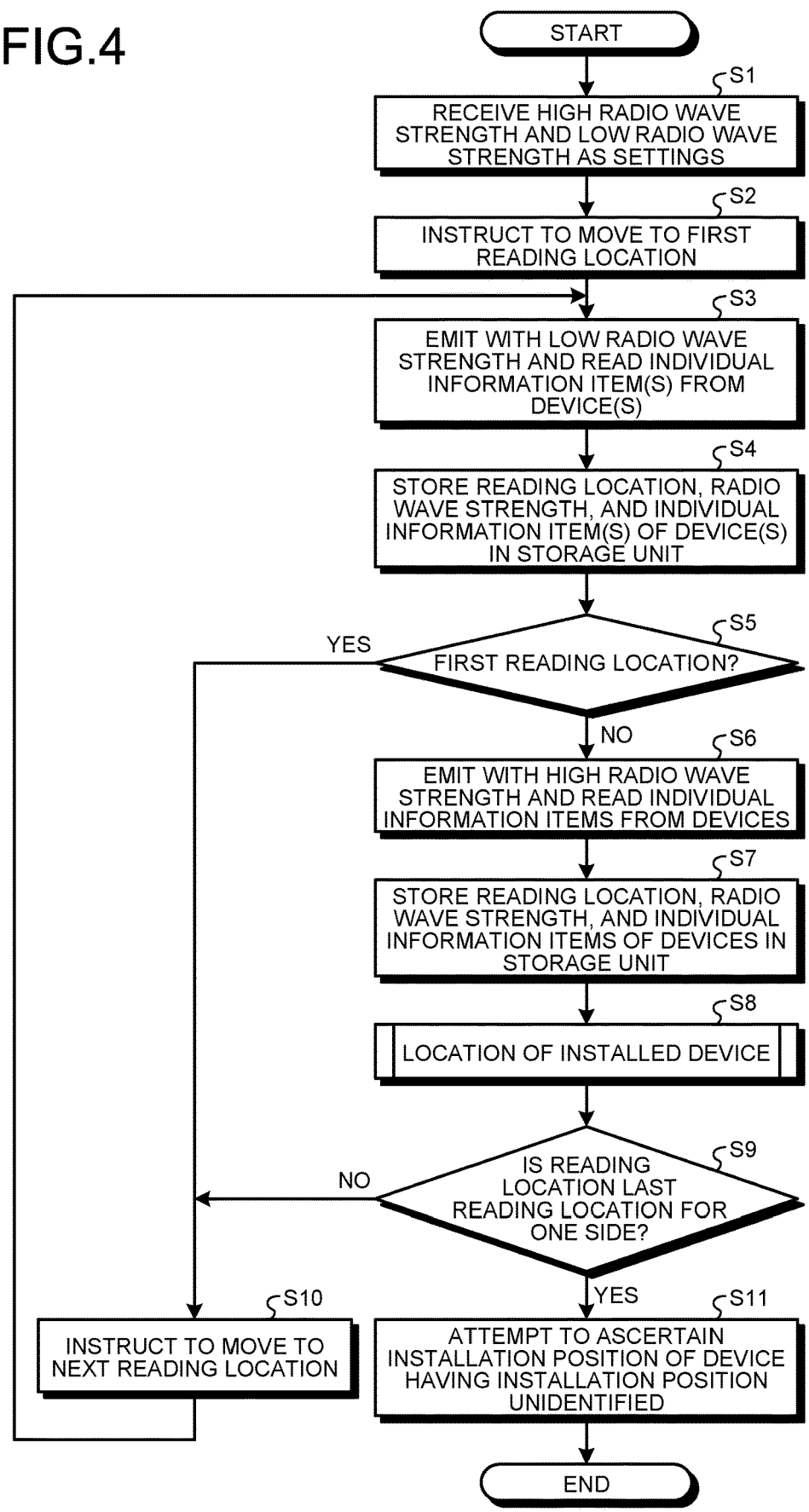
FIG. 4 is a flowchart illustrating how the position specifying device according to the first embodiment operates when associating respective installation positions of the devices with the individual information items.

A description is provided next of how the position specifying device 1 reads the individual information items of the devices from the identification tags, ascertains which individual-information-item carrying device is in which installation position of the vehicle 11, 12, or 13 of the train 10 and associates each of the devices' installation positions with the individual information item. FIG. 4 is a flowchart illustrating how the position specifying device 1 according to the first embodiment operates when associating the respective installation positions of the devices with the individual information items. The description provided here is of an example in which the position specifying device 1 reads the individual information items of the devices 21 to 28 from the identification tags 21a to 28a affixed respectively to the devices 21 to 28, and associates the installation positions of the devices 21 to 28 with the individual information items.

Standing, for example, in front of the device 22 by the side of the train 10, the user first allows the position specifying device 1 to emit radio waves toward the affixed identification tag 22a of the device 22 while changing the radio wave strength. The stronger the radio waves to emit, the more individual information items the position specifying device 1 can read from the identification tags of the devices. The user sets, for the position specifying device 1, namely, the reading controller 2, two radio wave strengths so that a varying number of individual information items are read by the position specifying device 1. Specifically, the user sets, for the position specifying device 1, a higher one of the two radio wave strengths as a high radio wave strength, and a lower one of the two radio wave strengths as a low radio wave strength. In other words, the reading controller 2 of the position specifying device 1 receives, from the user, the high radio wave strength and the low radio wave strength as the settings (step S1).

Using the device installation position information stored in the storage unit 4, the reading controller 2 instructs the user to move to the first location where radio waves are to be emitted for reading of the individual information items, that is to say, the initial reading location (step S2). In FIG. 2, the initial reading location is in front of the device 21 installed at the position A; however, this is an example. The initial reading location may be in front of the device 28 installed at the position H.

The reader 3 emits the radio waves with the preset low radio wave strength and reads the stored individual information items from the identification tags of the devices (step S3). The reader 3 stores, in the storage unit 4, information including the reading location, the radio wave strength, and the individual information items read (step S4).

FIG. 5 illustrates an example of a registration table that is to be stored in the storage unit 4 of the position specifying device 1 according to the first embodiment and is to store the reading locations, the radio wave strengths, and the individual information items that have been read. In FIG. 5, "INDIVIDUAL INFORMATION ITEM" refers to the individual information item read from the device by the reader 3, "A, B, C, D, E, F, G, and H" refer to the reading locations, "HIGH" refers to a condition in which the individual information item of the device has been read with the high radio wave strength, and "LOW" refers to a condition in which the individual information item of the device has been read with the low radio wave strength. For convenience sake, the positions A to H are used in FIG. 5 to represent the reading locations in front of the devices 21 to 28, which are installed respectively in the positions A to H. FIG. 5 shows results obtained when the radio wave emission at all of the reading locations in front of the positions A to H has been finished. When the reader 3 has read the individual information items "101" and "102" with the low radio wave strength at the initial reading location, namely, the location in front of the device 21 installed at the position A, the reader 3 stores the results in the storage unit 4.

Because this is the initial reading location (Yes to step S5), the reading controller 2 instructs the user to move to the next reading location, specifically, the location in front of the device 22 installed at the position B, by using the device installation position information stored in the storage unit 4 (step S10). At an end of the train 10, the position specifying device 1 does not need to use the varied radio wave strengths to obtain two reading results. This is because the position specifying unit 5 (described later) only needs one reading result for a process of associating the installation position of the device with the individual information item. Therefore, at the initial reading location, the position specifying device 1 does not perform processes of emitting the radio waves with the preset high radio wave strength and reading the stored individual information item of the device 21 from the identification tag 21*a*. In steps S3 and S4, the reader 3 performs the same operation as that described above. Because the position B is not the initial reading location (No to step S5), the reading controller 2 proceeds to step S6.

The reader 3 emits radio waves with the preset high radio wave strength and reads the stored individual information items from the identification tags of the devices (step S6). The reader 3 stores, in the storage unit 4, information including the reading location, the radio wave strength, and the individual information items read (step S7). At this point, the table of FIG. 5 stored in the storage unit 4 shows the information relevant to the position A and the information relevant to the position B.

Figure 6:
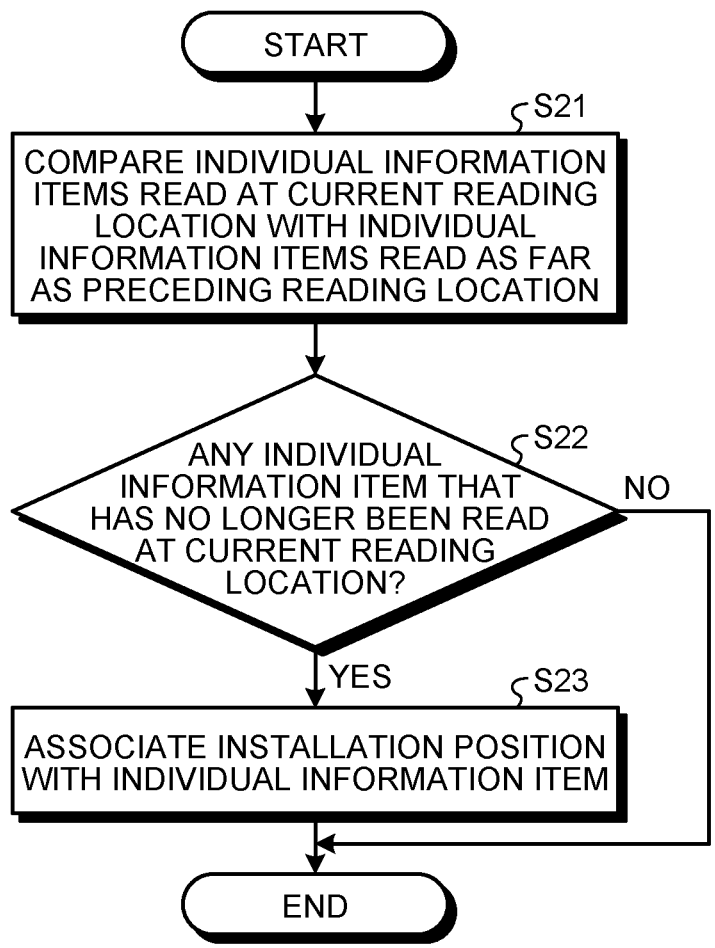
FIG. 6 is a flowchart illustrating how a position specifying unit according to the first embodiment operates for specifying a position of the installed device.

Using the device installation position information and the devices' individual information items read with the varied radio wave strengths at each of the reading locations, the position specifying unit 5 identifies the installed device by ascertaining which one of the devices each carrying the individual information item is in which one of the installation positions of the vehicle 11, 12, or 13 of the train 10 (step S8). A detailed description is provided of how the position specifying unit 5 operates. FIG. 6 is a flowchart illustrating how the position specifying unit 5 according to the first embodiment operates for specifying the positions of the installed devices. The position specifying unit 5 compares the individual information items read at the current reading location with the individual information items read as far as the preceding reading location (step S21). The position specifying unit 5 checks whether or not there is any individual information item that has no longer been read at the current reading location (step S22).

Specifically, the position specifying unit 5 compares the individual information items indicated in FIG. 5 for the position B with the individual information items indicated in FIG. 5 for the position A. At the position A, the individual information items "101" and "102" have been read with the low radio wave strength. At the position B, however, the individual information item "101" has no longer been read with the low radio wave strength. Ascertaining that there is an individual information item that has no longer been read at the current reading location (Yes to step S22), the position specifying unit 5 associates the installation position A with the individual information item "101" (step S23). In other words, the position specifying unit 5 uses the individual information items read with the varied radio wave strengths at a first reading location that is the current reading location, and the individual information items read with the varied radio wave strengths at a second reading location that immediately precedes the first reading location, for determining whether or not there is any individual information item that has been read at the second reading location but not at the first reading location. When there is an individual information item that has no longer been read at the first reading location, the position specifying unit 5 associates, with the individual information item, the installation position that is closer to the second reading location than the first reading location and is farthest from the first reading location among those installation positions that are included in the device installation position information and are not yet each associated with the individual information item. In the above example, the reading location in front of the device 22 installed at the position B is the first reading location, and the reading location in front of the device 21 installed at the position A is the second reading location. Moreover, the position A is the installation position that is closer to the second reading location than the first reading location and is farthest from the first reading location among those installation positions that are included in the device installation position information and are not yet each associated with the individual information item. When there is no individual information item that has no longer been read at the current reading location (No to step S22), the position specifying unit 5 does not perform the process indicated by step S23.

A return is made to the description of the flowchart of FIG. 4. The reading controller 2 determines whether or not the current reading location is the last reading location for one of the both sides of the train 10, that is to say, for the one side (step S9). In the example of FIG. 4, the reading location in front of the device 28 installed at the position H corresponds to the last reading location for the one side. When the current reading location is not the last reading location for the one side of the train 10 (No to step S9), the reading controller 2 returns to the process indicated by step S10. When the individual information items of the devices have been read by the reader 3 with the varied radio wave strengths at the given reading location, the reading controller 2 instructs the user to move to the next reading location on the basis of the device installation position information (step S10). Thereafter, the position specifying device 1 repeats a process from step S3 to S8.

When the current reading location is the last reading location for the one side of the train 10 (Yes to step S9), the position specifying unit 5 attempts to ascertain the installation position of the device having the installation position unidentified by using the device installation position information and the devices' individual information items read with the varied radio wave strengths at each of the reading locations (step S11). With yes answered to step S9, the installation positions A to G are being associated respectively with the individual information items "101" to "107" by the position specifying unit 5. The position specifying unit 5 compares the individual information items read at the reading location in front of the device 28, which is installed at the position H, with the individual information items read as far as the reading location in front of the device 27, which is installed at the position G. The position specifying unit 5 cannot read the individual information item "108" at the reading location in front of the device 26, which is installed at the position F, but has been read both at the reading location in front of the device 27, which is installed at the position G, and at the reading location in front of the device 28, which is installed at the position H. The position H is the only the installation position not yet associated with the individual information item and the individual information item "108" is the only individual information item not yet associated with the installation position. Accordingly, the position specifying unit 5 determines that the individual information item of the device installed at the position H is the individual information item "108" and associates the installation position H with the individual information item "108".

In the process indicated by the flowchart of FIG. 6, the position specifying unit 5 associates the individual information item that has no longer been read at the current reading location with the installation position; however, this is a non-limiting example. The position specifying unit 5 may associate, with the installation position, the individual information item that has come readable at the current reading location as in step S11 of FIG. 4. For example, at the reading location (current reading location) in front of the device 22, which is installed at the position B, the position specifying device 1 has read the individual information items "102" and "103" with the low radio wave strength and the individual information item "103" with the high radio wave strength. At the preceding reading location in front of the device 21, which is installed at the position A, the position specifying device 1 has read the individual information items "101" and "102" with the low radio wave strength. Because each of the installation positions is to be associated with the single individual information item, the fact that the individual information item "103" has been read at the current reading location but not at the first reading location enables the position specifying unit 5 to assume that the installation position A or B is to be associated with either of the individual information items "101" and "102" that have been read at the preceding reading location. Consequently, the position specifying unit 5 is enabled to associate the position C, which corresponds to the third reading location from the end, with the individual information item "103" that has not been read at the first reading location.

Upon finishing the reading at the last reading location for the one side, the position specifying device 1 indicates, to the user, the opposite side, namely, the reading location where some of the identification tags 31a to 38a affixed to the devices 31 to 38 can be read, and then performs the same processes for the devices 31 to 38 as the position specifying device 1 has performed for the devices 21 to 28.

The position specifying device 1 stores the individual information items associated with the respective installation positions, in a server which is not illustrated. The position specifying device 1 may pass the individual information items associated with the respective installation positions to the server via communication or a storage medium. Thus when there is a failed device, a user is enabled to ascertain what kind of train composition has used the failed device by searching the server for the individual information item of the failed device.

When the position specifying unit 5 has the installation position that the position specifying unit 5 has not succeeded in associating with the individual information item, the position specifying unit 5 may notify the user of the fact. The user receives the notification from the position specifying unit 5 and causes the individual information item of the device read individually from the identification tag affixed to the device at the installation position with which the association has not succeeded. In this case, the individual work by the user takes place. However, compared to when the user causes all the individual information items of the devices read individually, the use of the position specifying device 1 enables the user to have reduced work time.

A description is provided next of a hardware configuration of the position specifying device 1. The reader 3 of the position specifying device 1 is an RFID reader that emits radio waves toward RFIDs. The storage unit 4 is a memory. The reading controller 2 and the position specifying unit 5 are implemented by processing circuitry. The processing circuitry may include a memory and a processor that executes programs stored in the memory or may be dedicated hardware.

Figure 7:
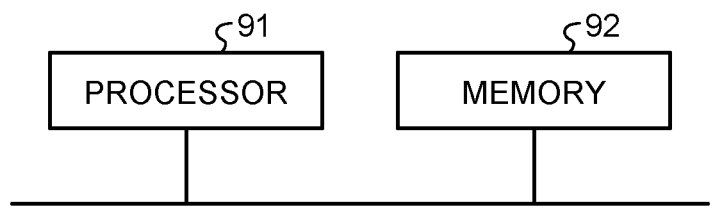
FIG. 7 illustrates an example in which a processing circuitry of the position specifying device according to the first embodiment is configured to include a processor and a memory.

FIG. 7 illustrates an example in which the processing circuitry of the position specifying device 1 according to the first embodiment is configured to include a processor and a memory. When the processing circuitry includes the processor 91 and the memory 92, the processing circuitry of the position specifying device 1 is functionally implemented by software, firmware, or a combination of software and firmware. The software or the firmware is described as programs and is stored in the memory 92. In the processing circuitry, the processor 91 reads and executes the programs stored in the memory 92 for functional implementations. This means that the memory 92 included in the processing circuitry stores the programs, which eventually execute the processes of the position specifying device 1. These programs can be said to cause a computer to execute the steps and the methods of the position specifying device 1.

The processor 91 here may be, for example, a central processing unit (CPU), a processing unit, an arithmetic unit, a microprocessor, a microcomputer, or a digital signal processor (DSP). The memory 92 corresponds to, for example, a nonvolatile or volatile semiconductor memory such as a random-access memory (RAM), a read-only memory (ROM), a flash memory, an erasable programmable ROM (EPROM), or an electrically EPROM (EEPROM) (registered trademark), a magnetic disk, a flexible disk, an optical disk, a compact disk, a mini disk, or a digital versatile disc (DVD).

Figure 8:
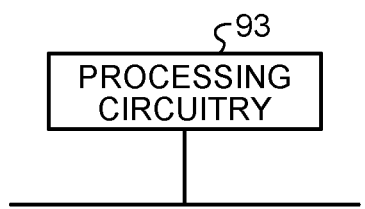
FIG. 8 illustrates an example in which the processing circuitry of the position specifying device according to the first embodiment is configured as dedicated hardware.

FIG. 8 illustrates an example in which the processing circuitry of the position specifying device 1 according to the first embodiment is configured as dedicated hardware. When the processing circuitry is the dedicated hardware, the processing circuitry 93 illustrated in FIG. 8 corresponds to, for example, a single circuit, a composite circuit, a programmed processor, a parallel programmed processor, an application specific integrated circuit (ASIC), a field-programmable gate array (FPGA), or a combination of these. Those functions of the position specifying device 1 may be implemented individually or collectively by the processing circuitry 93.

It is to be noted that some of the functions of the position specifying device 1 may be implemented by dedicated hardware, while some of the other functions may be implemented by software or firmware. By including the dedicated hardware, the software, the firmware or a combination of these, the processing circuitry is capable of the above functional implementations.

According to the present embodiment described above, when reading the devices' individual information items from the identification tags affixed to the devices, the position specifying device 1 changes the radio wave strength in the radio wave emission and causes the reading location to be changed. Using the device installation position information and the devices' individual information items read with the varied radio wave strengths at each of the reading locations, the position specifying device 1 specifies the position of the installed device by ascertaining which one of the devices each carrying the individual information item is in which one of the installation positions of the vehicle of the train, and associates the installation position with the individual information item of the device. This enables the position specifying device 1 to have reduced work time required to specify the positions of the devices installed at the train compared to when the individual information items of the devices are read individually.

Second Embodiment

In the first embodiment, the position specifying device 1 obtains only the individual information item from each of the devices installed on the vehicles 11 to 13 of the train 10. A position specifying device according to the second embodiment obtains, from each of the devices, a device state information item indicating an operating state of the device. A description is provided of difference from the first embodiment.

Figure 9:
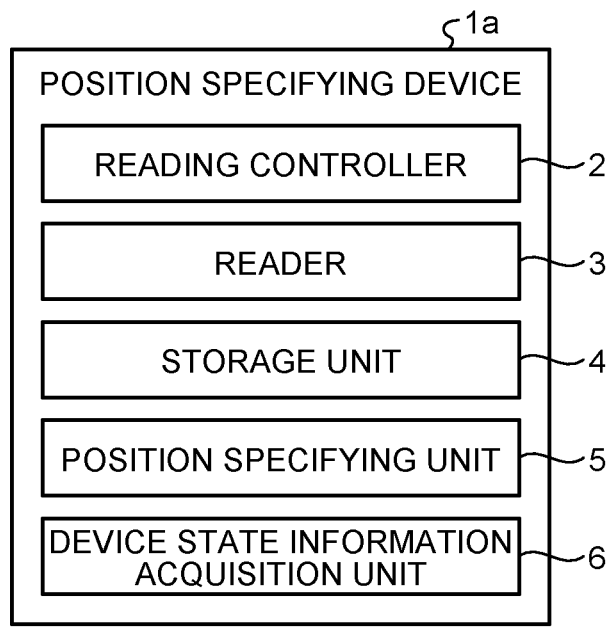
FIG. 9 is a block diagram illustrating a configuration example of a position specifying device according to a second embodiment.

FIG. 9 is a block diagram illustrating a configuration example of the position specifying device 1a according to the second embodiment. Compared with the FIG. 3 position specifying device 1 according to the first embodiment, the position specifying device 1a additionally includes a device state information acquisition unit 6. The device state information acquisition unit 6 obtains the device state information items from the respective devices. The device state information acquisition unit 6 stores the device state information items in the storage unit 4. Each of the device state information items indicates the operating state of the device and enables a varying characteristic of the device to be ascertained. The device state information items are different depending on the devices. The device state information item is, for example, a contact opening/closing count that indicates how many times a relay is switched in the device and can be measured in the form of voltage values, current values, vibration values, pressure values, or any other values with a sensor attached to the device. The individual information item of each of the devices may be associated with the device state information item by the device, the position specifying device, or a server having information transmitted from the position specifying device.

Figure 10:
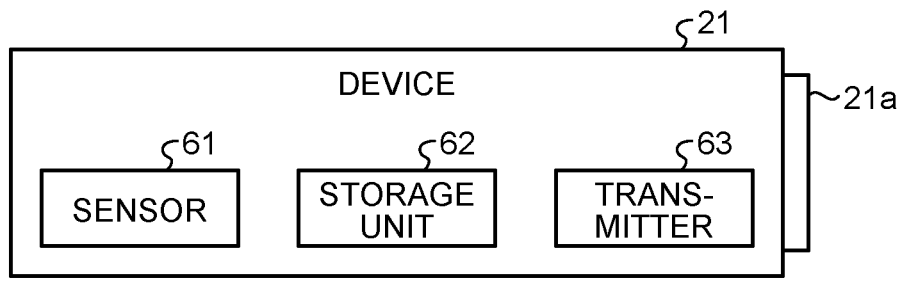
FIG. 10 is a block diagram illustrating a configuration example of a device according to the second embodiment.

Using the device 21, a concrete description is provided of the device that associates the individual information item of the device with the device state information item. FIG. 10 is a block diagram illustrating a configuration example of the device 21 according to the second embodiment. The device 21 includes a sensor 61, a storage unit 62, and a transmitter 63. It is to be noted that FIG. 10 illustrates only a functional part that transmits the device state information item, so that a functional part that performs intrinsic operation of the device 21 is omitted. The sensor 61 detects the device state information item indicating the characteristic of the device 21 and stores the detected device state information item in the storage unit 62. When the device 21 is, for example, a brake, the sensor 61 detects air pressure values or others that control the operation of the brake. The device 21 may include a plurality of the sensors 61 for different uses. The storage unit 62 stores the device state information item detected by the sensor 61. When the individual information item has been read from the identification tag 21a by the position specifying device 1a, the transmitter 63, which is a transmitting device, reads the device state information item from the storage unit 62, obtains the individual information item from the identification tag 21a and transmits the device state information item to the position specifying device 1a. Although not illustrated, compared with the position specifying system 50 of FIG. 1, a position specifying system according to the second embodiment includes the position specifying device 1a in place of the position specifying device 1 and additionally includes the transmitter 63, which is the transmitting device. With the sensor 61 included in the device 21, the storage unit 62 and the transmitter 63 may be included in another device separate from the device 21. Even in this case, the device state information item detected by the sensor 61 is stored in the storage unit 62.

Figure 11:
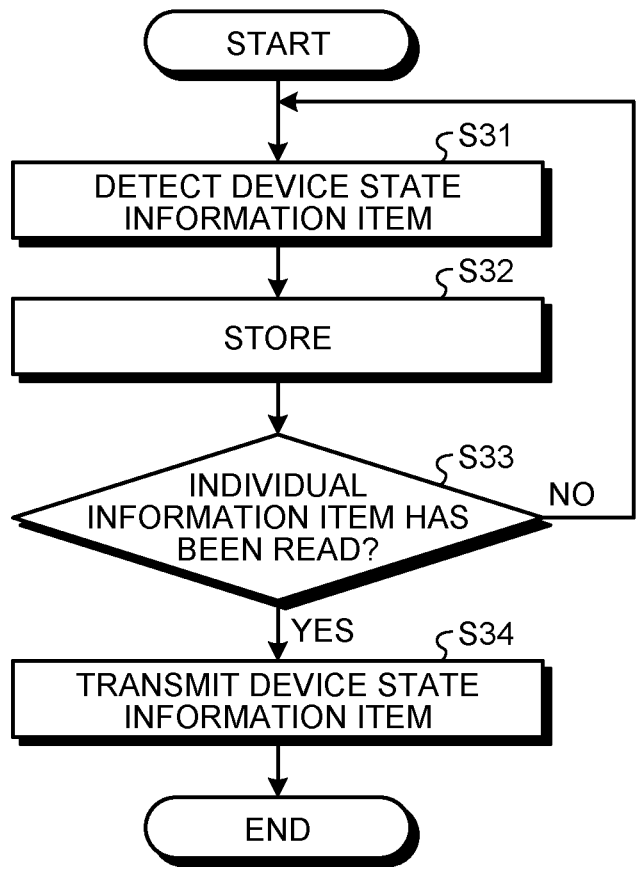
FIG. 11 is a flowchart illustrating how the device according to the second embodiment operates when transmitting a device state information item.

FIG. 11 is a flowchart illustrating how the device 21 according to the second embodiment operates when transmitting the device state information item. The sensor 61 of the device 21 detects the device state information item (step S31) and stores the detected device state information item in the storage unit 62 (step S32). When the individual information item has not been read from the identification tag 21a yet (No to step S33), assuming that the position specifying device 1a is not near the device 21, the device 21 continues following steps S31 and S32. When the individual information item has been read from the identification tag 21a (Yes to step S33), assuming that the position specifying device 1a is near the device 21, the transmitter 63 reads the device state information item from the storage unit 62, obtains the individual information item from the identification tag 21a and transmits the device state information item to the position specifying device 1a (step S34). The transmitter 63 determines that the individual information item has been read from the identification tag 21a (Yes to step S33) when, for example, the transmitter 63 or a sensor that is not illustrated has detected radio waves emitted from the position specifying device 1a; however, the determination is not limited to this method. While the device 21 has been described as an example, the other devices operate similarly.

As with the position specifying device 1 according to the first embodiment, the position specifying device 1a obtains the individual information item from each device. This is when the device state information item should be obtained only once from each device. FIG. 12 is a flowchart illustrating how the position specifying device 1a according to the second embodiment operates when obtaining the device state information item. When the device state information acquisition unit 6 of the position specifying device 1a has obtained the device state information item from the device (step S41), the device state information acquisition unit 6 stores the device state information item in the storage unit 4 (step S42).

The position specifying device 1a stores the obtained device state information item along with the individual information item in the server, which is not illustrated. The position specifying device 1a may pass the obtained device state information item to the server, via communication or a storage medium. Thus when there is a failed device, a user is enabled to ascertain what kind of train composition has used the failed device by searching the server for the individual information item of the failed device. Moreover, use of the device state information item of the failed device enables the user to ascertain changes in the device's operation that have led up to the failure. The position specifying device 1a may obtain the device state information item along with the individual information item of the device.

As described above, the position specifying device 1a according to the present embodiment obtains the device state information item from each device. This enables the position specifying device 1a to store the device state information item in association with a use state of the device.

The above configurations illustrated in the embodiments are illustrative of contents of the present invention, can be combined with other techniques that are publicly known and can be partly omitted or changed without departing from the gist of the present invention.

REFERENCE SIGNS LIST 1, 1a position specifying device; 2 reading controller; 3 reader; 4, 62 storage unit; 5 position specifying unit; 6 device state information acquisition unit; 10 train; 11 to 13 vehicle; 21 to 28, 31 to 38 device; 21a to 28a, 31a to 38a identification tag; 50 position specifying system; 61 sensor; 63 transmitter.

The invention claimed is:

1. A position specifying device comprising:
a storage to store device installation position information indicating a plurality of installation positions for a plurality of devices installed on a plurality of vehicles of a train, store a plurality of reading locations at each of which at least one individual information item identifying one of the plurality of the devices is read from an identification tag storing the individual information item, each of the reading locations being where radio waves are emitted toward the identification tag affixed to corresponding one of the plurality of the devices; and
processing circuitry to ascertain, by use of the device installation position information and the individual information items read at the plurality of the reading locations that are sequentially arranged along a side of the train, which one of the plurality of the devices each carrying the individual information item is in which one of the plurality of the installation positions of the plurality of the vehicles of the train, and associate the one of the plurality of the installation positions with the individual information item identified,
wherein each of the plurality of reading locations is stored prior to the position specifying device performing a reading at one or more of the plurality of reading locations and prior to the processing circuitry performing the ascertaining and the associating, and
the processing circuitry performs reading sequentially from a reading location at an end of the train as an initial reading position.

2. The position specifying device according to claim 1, wherein
the processing circuitry uses one or more individual information items read with the varied radio wave strengths at a first reading location among the plurality of the reading locations and one or more individual information items read with the varied radio wave strengths at a second reading location that immediately precedes the first reading location among the plurality of the reading locations, and when there is an individual information item that is read at the second reading location but not at the first reading location, the processing circuitry associates, with the individual information item, one of the plurality of the installation positions that is closer to a second reading location than the first reading location and is farthest from the first reading location among some of the plurality of the installation positions that are included in the device installation position information and are not yet each associated with an individual information item.

3. The position specifying device according to claim 1, wherein:
the processing circuitry indicates one of the plurality of the reading locations to a user on a basis of the device installation position information, and controls the radio wave strength in the radio wave emission toward the identification tag at the one of the reading locations; and
the position specifying device further comprises a radio frequency identification reader to read, from one or more identification tags, one or more individual information items each stored in each of the identification tags of the corresponding one of the plurality of the devices with the radio wave strength variably controlled.

4. The position specifying device according to claim 3, wherein
when the radio frequency identification reader performs reading for one or more individual information items of one or more of the plurality of the devices with the varied radio wave strengths at a given reading location among the plurality of the reading locations, the processing circuitry instructs a user to move to a next reading location among the plurality of the reading locations on the basis of the device installation position information.

5. The position specifying device according to claim 1, wherein
the processing circuitry further obtains, from any of the plurality of the devices, a device state information item indicating an operating state of corresponding one of the plurality of the devices.

6. A position specifying system comprising:
the position specifying device according to claim 1; and
identification tags each of which is affixed to corresponding one of the devices installed under floors of the plurality of the vehicles of the train, each of the identification tags storing an individual information item identifying one of the plurality of the devices.

7. A position specifying system comprising:
the position specifying device according to claim 5;
identification tags each of which is affixed to corresponding one of the plurality of the devices installed under floors of the plurality of the vehicles of the train, each of the identification tags storing an individual information item identifying one of the plurality of the devices; and
a transmitting device to transmit, to the position specifying device, the device state information item indicating an operating state of one of the devices, the transmitting device being installed in each of the plurality of the devices.

8. A position specifying method of a position specifying device, the position specifying method comprising:
storing, by a storage unit of the position specifying device, device installation position information indicating a plurality of installation positions for a plurality of devices installed on a plurality of vehicles of a train, and a plurality of reading locations at each of which at least one individual information item identifying one of the plurality of the devices is read from an identification tag storing the individual information item;
ascertaining, by use of the device installation position information and the individual information items read at the plurality of the reading locations that are sequentially arranged along a side of the train, which one of the plurality of the devices each carrying the individual information item is in which one of the plurality of the installation positions of the plurality of the vehicles of the train; and associating the one of the plurality of the installation positions with the individual information item identified, wherein each of the plurality of reading locations is stored prior to the position specifying device performing a reading at one or more of the plurality of reading locations and prior to performing the ascertaining and the associating, and reading the plurality of the reading locations is performed sequentially from a reading location at an end of the train as an initial reading position.

9. The position specifying method according to claim 8, wherein one or more individual information items read with the varied radio wave strengths at a first reading location among the plurality of the reading locations and one or more individual information items read with the varied radio wave strengths at a second reading location that immediately precedes the first reading location among the plurality of the reading locations, are used in the ascertaining and when there is an individual information item that is read at the second reading location but not at the first reading location, the individual information item is associated with one of the plurality of the installation positions that is closer to a second reading location than the first reading location and is farthest from the first reading location among some of the plurality of the installation positions that are included in the device installation position information and are not yet each associated with an individual information item.

10. The position specifying method according to claim 8, further comprising:

indicating one of the plurality of the reading locations to a user on a basis of the device installation position information; and controlling the radio wave strength in the radio wave emission toward the identification tag at the one of the reading locations; and reading, from one or more identification tags, one or more individual information items each stored in each of the identification tags of the corresponding one of the plurality of the devices with the radio wave strength variably controlled.

11. The position specifying method according to claim 10, wherein when reading for one or more individual information items of one or more of the plurality of the devices is performed with the varied radio wave strengths at a given reading location among the plurality of the reading locations, an instruction is issued to a user to move to a next reading location among the plurality of the reading locations on the basis of the device installation position information.

12. The position specifying method according to claim 8, further comprising obtaining, from any of the plurality of the devices, a device state information item indicating an operating state of corresponding one of the plurality of the devices.

13. A non-transitory computer readable storage medium storing a position specifying program to cause a processor to carry out the position specifying method according to claim 8.

14. The position specifying device according to claim 1, wherein the storage stores, correspondingly to radio wave strength for each of the plurality of the reading locations, at least one individual information item that is read with varied radio wave strengths in radio wave emission toward the identification tag of the corresponding one of the plurality of the devices.

15. The position specifying device according to claim 14, wherein the individual information items which the processing circuitry uses are individual information items read with the varied radio wave strengths at the plurality of the reading locations.

16. The position specifying method according to claim 8, wherein in the storage, correspondingly to radio wave strength for each of the plurality of the reading locations, at least one individual information item that is read with varied radio wave strengths in radio wave emission toward the identification tag of the corresponding one of the plurality of the devices, is stored.

17. The position specifying method according to claim 16, wherein the individual information items which the processing circuitry uses are individual information items read with the varied radio wave strengths at the plurality of the reading locations.

18. A position specifying device comprising processing circuitry to ascertain, on a basis of an individual information item read by radio wave emission toward identification tags each of which is affixed to one of a plurality of devices installed on vehicles of a train, a plurality of reading locations where radio waves are emitted toward the identification tags that allow the individual information items to be read, and device installation position information indicating installation positions for the plurality of devices in the vehicles, which one of the plurality of the devices each carrying one of the individual information items is in which one of the plurality of the installation positions of the vehicles of the train; and storage to store the plurality of reading locations that are sequentially arranged along a side of the train, wherein each of the plurality of reading locations is stored prior to the position specifying device performing a reading at one or more of the plurality of reading locations and prior to the processing circuitry performing the ascertaining, wherein the processing circuitry performs reading sequentially from a reading location at an end of the train as an initial reading position.

* * * * *